United States Patent [19]

Toide et al.

[11] Patent Number: 5,450,380
[45] Date of Patent: Sep. 12, 1995

[54] OPTICAL DISK HAVING AN $SiO_2$ COATING

[75] Inventors: Yukari Toide; Motohisa Taguchi; Kazuhiko Tsutsumi, all of Amagasaki, Japan

[73] Assignee: Mitsubishi Denki Kabushiki Kaisha, Tokyo, Japan

[21] Appl. No.: 10,502

[22] Filed: Jan. 28, 1993

Related U.S. Application Data

[63] Continuation of Ser. No. 699,889, May 14, 1991, abandoned.

[30] Foreign Application Priority Data

May 15, 1990 [JP] Japan ................... 2-126040
May 18, 1990 [JP] Japan ................... 2-129998

[51] Int. Cl.⁶ .............................................. G11B 7/24
[52] U.S. Cl. ................................. 369/275.5; 369/286
[58] Field of Search .................. 369/275.2, 275.5, 284, 369/286, 288, 13; 360/114; 430/945, 495; 346/135.1

[56] References Cited

U.S. PATENT DOCUMENTS

| | | | |
|---|---|---|---|
| 4,954,379 | 9/1990 | Nishida et al. | 428/64 |
| 5,013,594 | 5/1991 | Mizumura et al. | 369/288 |
| 5,031,172 | 7/1991 | Umeda et al. | 346/135.1 |
| 5,197,049 | 3/1993 | Wehrenberg | 369/13 |
| 5,270,987 | 12/1993 | Kaku et al. | 369/13 |

FOREIGN PATENT DOCUMENTS

| | | |
|---|---|---|
| 0320286 | 6/1989 | European Pat. Off. |
| 63-70945 | 3/1988 | Japan ................... 360/114 |
| 63-112632 | 5/1988 | Japan . |
| 1-292639 | 11/1989 | Japan . |
| 2-18729 | 1/1990 | Japan . |
| 2-227845 | 9/1990 | Japan . |

*Primary Examiner*—Hoa T. Nguyen
*Attorney, Agent, or Firm*—Wolf, Greenfield & Sacks

[57] ABSTRACT

An optical disk adapted to resist moisture absorption, warping and static charge is disclosed. The disk includes an $SiO_2$ film coating over at least a portion of a disk substrate. Additionally, an optical disk having a magnetic film protected by a fluorocarbon polymer is disclosed. Either of such disks can be used individually or, alternatively, they can be used in a laminated structure having two disks laminated in a face-to-face relationship. The laminated structure can be covered with $SiO_2$ film.

3 Claims, 14 Drawing Sheets

Fig. 1

Prior Art

Prior Art

OPTICAL DISK HAVING AN SIO₂ COATING

This application is a continuation of application Ser. No. 07/699,889, filed May 14, 1991, now abandoned.

BACKGROUND OF THE INVENTION

1. Field of the Invention

This invention relates to an optical disk for optically recording/reproducing data.

2. Description of Related Art

A transparent plastic substrate is suitable for an optical disk from the viewpoints of the convenience of duplication, and particularly, a polycarbonate substrate is low cost.

However, when such a plastic substrate that has relatively large moisture permeability as the polycarbonate substrate is used, only the surface other than a recording surface of the substrate absorbs moisture, causing warp of the substrate. The plastic substrate of the above-mentioned type generates a large warp, especially under the circumstances having a large change of the temperature and humidity. In consequence, an actuator becomes unable to stably follow a focus servo or a tracking servo, resulting in faulty operation or errors.

Figure 1:
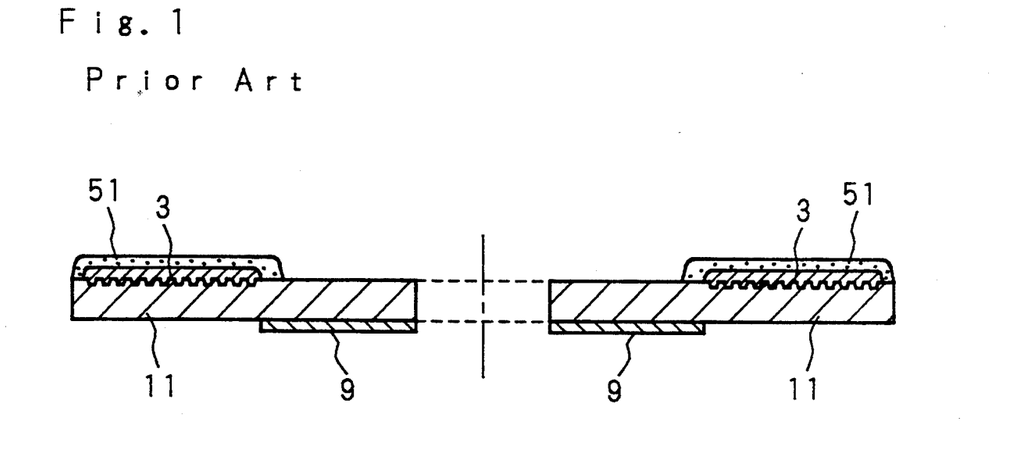
FIG. 1 and 3 are cross sectional views of a conventional optical disk.

In consideration of the above warp, a different type of an optical disk has been developed, wherein a moisture-proof film is formed on the surface opposite to the recording surface of the substrate. FIG. 1 shows a cross section of this type of the optical disk disclosed in Japanese Patent Laid-Open No. 1-292639 (1989), in which reference numerals 11, 3, 51 and 9 represent respectively a plastic substrate, a recording film, an ultraviolet light setting resin and a moisture-proof film.

The moisture-proof film 9 may be organic or inorganic. The organic film 9 is formed through application and the inorganic film 9 is formed through sputtering, vacuum evaporation, CVD, etc.

The moisture-proof film, when it is formed on a part of the disk, is effective to prevent the warp of the substrate against a gradual change of the temperature and humidity, but is impossible to avoid the warp generated when the temperature and humidity change abruptly. The reason is that the moisture distribution within the substrate is turned temporarily not to be uniform when the moisture is absorbed abruptly from the part of the substrate where the moisture-proof film is not formed, and the disk is locally expanded.

Therefore, it is necessary to form the transparent moisture-proof film all over the surface of the disk so that the substrate material is not in touch with the air. As is disclosed in the aforementioned prior art No. 1-292639, however, it has been known to be considerably difficult to form the moisture-proof film uniformly all over the surface of the disk. In other words, the mask used in the conventional manufacturing process through spin coating, sputtering, evaporation or the like is inevitably brought into touch with the substrate, and therefore, the film may not be formed all over the surface of the disk and a boundary is generated in the film, or very small holes (voids, pin holes) are generated in the film. As a result, the moisture-proof effect cannot be expected so much. What's worse, the moisture-proof film may peel or cause deterioration.

Further, since the laser beams enter the optical disk from the substrate side, the laser beams also pass through the moisture-proof film formed on the substrate. Accordingly, it is required to form the moisture-proof film without lowering the enhancement effect of the magneto-optical disk, the intensity of the incident light beams which is an essential property for the optical disk, or improvement in decreasing noises. Therefore, the optical constant, thickness, surface roughness of the moisture-proof film should be controlled properly, a highly sophisticated technique is necessary according to the conventional film forming method and the manufacturing cost increases.

Dusts adhered to the optical disk, or wiping the dusts off the optical disk alike causes a damage to the disk. To prevent this, it has been known to form a hard coat film or an antistatic film on the surface of the substrate. However, the original function as a hard coat material is reduced by half if the antistatic function is added. For example, in the case of the polycarbonate substrate which originally has the pencil hardness 3 H as the substrate and 7 H after applied with the hard coat film, the pencil hardness is 4 H if the antistatic function is added to the hard coat film. It has been impossible to achieve both the hard coat function and the antistatic function by one film hitherto.

Since the conventional hard coat material or antistatic material is an ultraviolet light setting resin or a thermosetting resin, and the method of forming the film is mainly spin coating, it has been difficult to form the film all over exposed the surface of the substrate. The innermost periphery or end face of the substrate remain without the film. If the disk is housed in a cartridge in use, for example, a portion of the disk without the film wears from butting against the protruding parts of the cartridge, abrasion dusts adhere to the disk, and the disk may be damaged when the abrasion dusts are removed.

Figure 2:
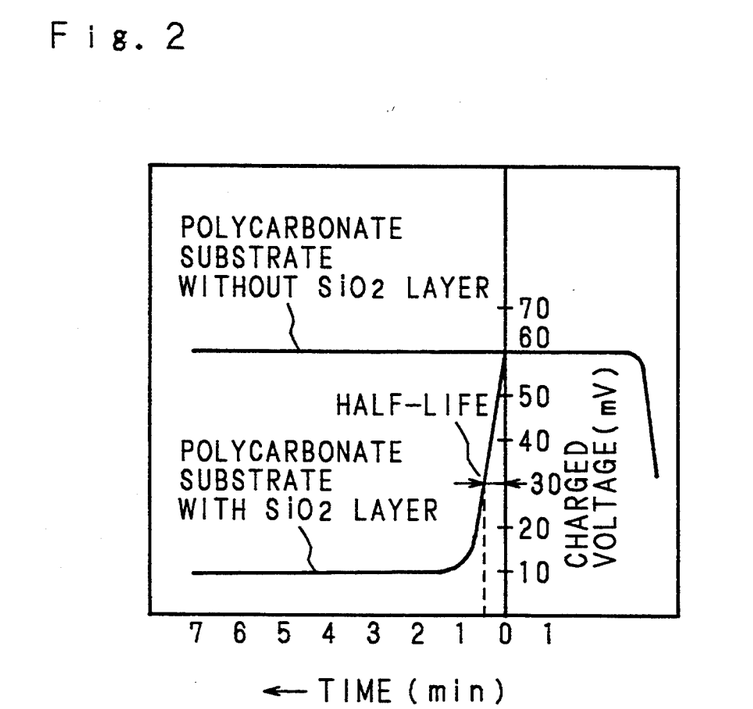
FIG. 2 is a graph for comparison of the charging conditions between a polycarbonate substrate with an SiO₂ layer and a polycarbonate substrate without an SiO₂ layer.

It is proposed in Japanese Patent Laid-Open No. 63-112632 (1988) to form a silicon dioxide ($SiO_2$) film on the substrate through Liquid Phase Deposition (LPD). According to this method, the whole disk is dipped into the treatment solution, so that the film can be formed uniformly all over the surface of the disk except where the disk is held by a tool. The film formed by this method displays not only good moisture-proof property, but large surface hardness and high antistatic function as indicated in FIG. 2.

However, if the film is formed thin, the film is not sufficiently dense or island-shaped. Since the film cannot interrupt the moisture to pass through, the moisture-proof efficiency is low, which makes it difficult to prevent the warp of the disk.

In the case where the film is formed on such a substrate of little hardness as the polycarbonate substrate, if the film is thin, the hardness of the substrate itself has a greater influence on the disk hardness than the hardness of the film. Therefore, the hardness of the substrate itself becomes the disk hardness so that the film cannot work as the hard coat material.

The antistatic function is achieved because of the electroconductivity of the film, that is, since the film does not store electric charges and therefore hardly generate static electricity. If the film is thin and formed in island-shape, i.e., having boundaries, the electric charges are easily be stored. Therefore, the electroconductivity of the film decreases considerably, whereby the antistatic function is hardly achieved.

Since in forming the $SiO_2$ layer through the LPD method, hydrofluoric acid is used as a solution, the metallic recording film is corroded by the solution, so that it is not possible to practice the LPD treatment after the recording film is formed. As such, according to the conventional method, the substrate is first subjected to the LPD treatment to form the SiO₂ layer all over the surface thereof, and then the recording layer is formed. However, if grooves or pre-pits are formed on the substrate, the SiO₂ layer is formed also on the grooves or pre-pits when the SiO₂ layer is thick, thereby undesirably changing the configuration of the grooves or pre-pits. Although a slight correction is possible by adjusting the setting of the stamper for forming the substrate, the adjustment needs a high-level technique, and therefore it is difficult to perfectly correct the change of the configuration of the grooves or pre-pits. Moreover, if the film is so thick as to fill in the grooves of the substrate formed by the stamper which is not adjusted, since the optimum value to set the stamper properly cannot be calculated, the proper grooves are not formed, causing the trouble in reading out signals. Accordingly, the LPD method has been hard to be applied to the optical disk.

Figure 3:
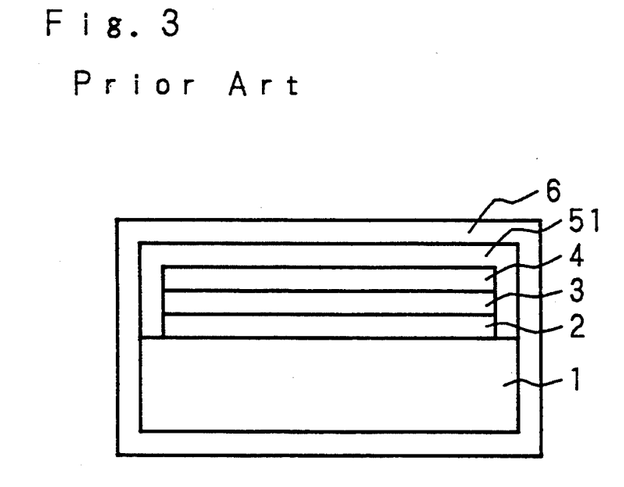

Another LPD method to form the SiO₂ film all over the surface of the optical disk is disclosed in Japanese Patent Laid-Open No. 2-18729 (1990). FIG. 3 is a cross section of the optical disk with the SiO₂ film formed thereon by the method disclosed in the above prior art. In FIG. 3, reference numerals 1, 2, 3, 4, 51 and 6 are respectively a plastic substrate, a dielectric film, a recording film, a dielectric protection film, an ultraviolet light setting resin and an SiO₂ layer.

According to this method, the optical recording film is formed on the substrate, on which the protection film to protect the optical recording film from the a hydrofluoric acid solution which is used in the LPD method, and thereafter the SiO₂ layer is formed on the whole surface through the LPD treatment. The protection film formed through sputtering or evaporation is not dense enough, with generating many pin holes. Therefore, almost the whole surface of the recording film is corroded. Moreover, since most of the general coating resins are not readily brought in tight contact with the recording film, the solution may infiltrate from the boundary between the resin and recording film or from the pin holes in the protection film to the recording film, so that the recording film is corroded or cracked. Accordingly, conventionally, for the protection film is used an ultraviolet light setting resin.

However, heat is added to the ultraviolet light setting resin when it is set. This heat may deform or warp the plastic substrate, thereby increasing the double refraction, bringing about cracks of the resin layer or recording film in the LPD treatment.

SUMMARY OF THE INVENTION

This invention has been devised to solve the above-discussed disadvantages inherent in the prior art, and has for its first object to provide an optical disk wherein at least the surface of a substrate in touch with the air is coated with an SiO₂ layer of 500 Å or more thick, thereby preventing the substrate from warping against an abrupt changing in the temperature and humidity, and also avoiding dusts and damage of the optical disk.

A second object of this invention is to provide an optical disk wherein a resin film covers a recording film to protect it, and an SiO₂ film with a thickness of not less than 500 Å covers the whole including the resin film or except the resin film, thereby preventing the substrate from warping against an abrupt change in the temperature and humidity, and also avoiding dusts and damages on the optical disk.

The above and further objects and features of the invention will more fully be apparent from the following detailed description with accompanying drawings.

DESCRIPTION OF THE PREFERRED EMBODIMENTS

An optical recording film formed on an optical disk of this invention may be any film formed by the conventional known method. For example, it may be obtained by sequentially forming a dielectric film of SiNx or the like, then an amorphous recording film of TbFeCo or the like having vertical magnetic anisotropy, and a protection film of siNx or the like.

Figure 4:
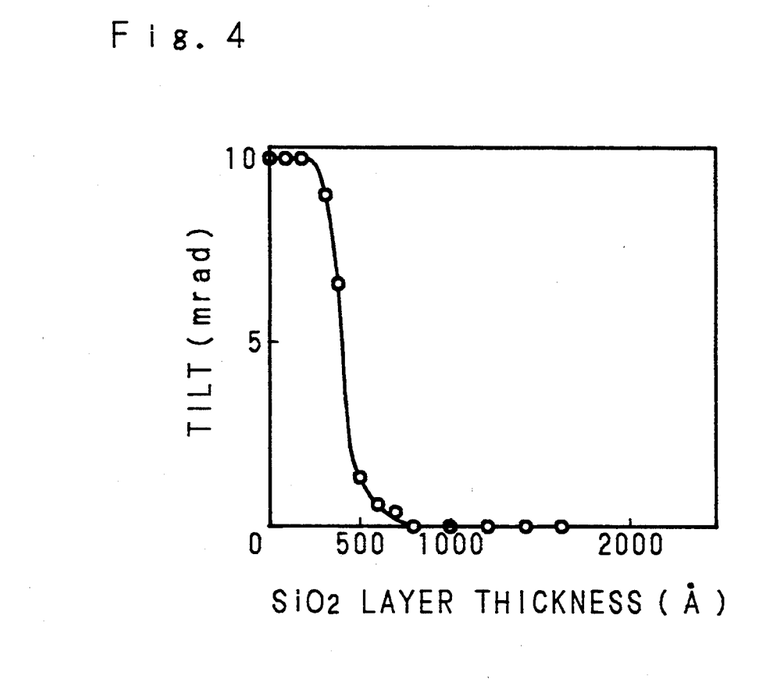
FIG. 4 is a graph showing the relation between the thickness of the SiO₂ layer and the tilt of the disk.

When a plastic substrate such as a polycarbonate substrate, etc. is used, if the substrate is without laminating, it warps greatly in accordance with the variation of the temperature and humidity. The substrate without laminating is not suitable for practical use. Therefore, an SiO₂ layer having moisture-proof effect is formed through LPD method at least on a portion where the substrate is exposed. In this case, if the SiO₂ is thinner than 500 Å, it is revealed from experiments that the warp of the substrate cannot be sufficiently prevented. FIG. 4 is a graph showing the tilt of the optical disks each having the SiO₂ layer of a different thickness from each other formed by the LPD method shown in Japanese Patent Laid-Open No. 68-112682 (1988) on the polycarbonate substrate of 130 mm φ with grooves and pre-pits and the above-described optical recording film formed thereon when the circumstances are changed from 60° C. 50%RH to 60° C.90%RH. According to the above-mentioned LPD method, the whole disk is dipped into the treatment solution, so that the film can be formed uniformly all over the surface of the disk except where the disk is held by a tool. The moisture-proof effect of the SiO₂ layer on the substrate is turned effective when the layer is not thinner than 500 Å.

Figure 5:
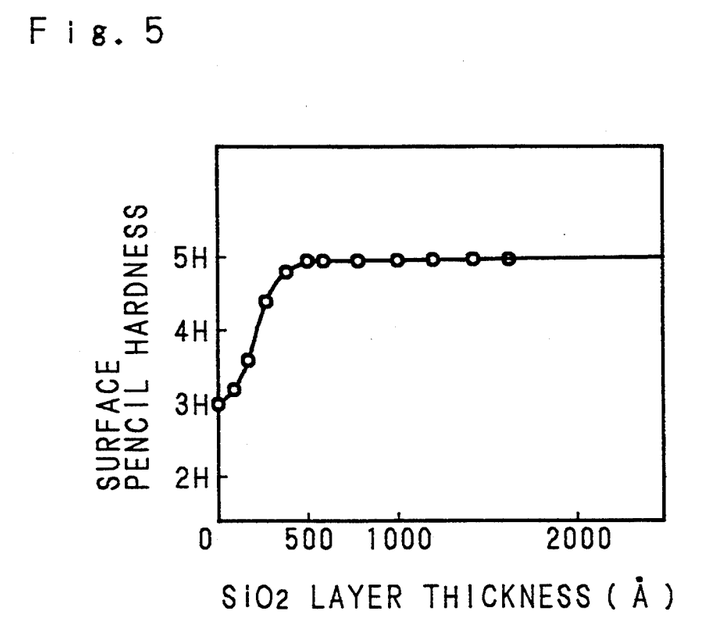
FIG. 5 is a graph showing the relation between the thickness of the SiO₂ layer and the pencil hardness of the surface of the disk.

The surface pencil hardness of the substrate side is shown in a graph of FIG. 5. As is clear from FIG. 5, the surface hardness is almost saturated at the thickness of the SiO₂ layer of 400 Å, and stable at the thickness over 500 Å in 5 H.

Figure 6:
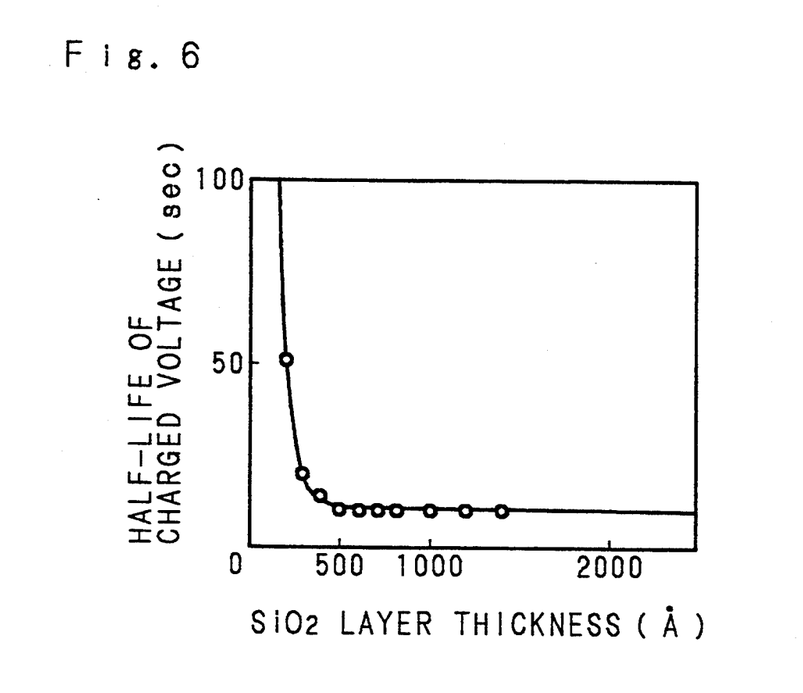
FIG. 6 is a graph showing the relation between the thickness of the SiO₂ layer and half life of the charged voltage.

Furthermore, the change of the charged voltage, when the optical disk is discharged after it is charged with 60 mV, is detected as indicated in FIG. 2, and the time when the charged voltage is reduced to half, i.e., half life is found as shown in FIG. 6. The half life suddenly decreases at 200 Å of the film thickness of the SiO$_2$ layer, and becomes stable, merely about 10 seconds when the film thickness is over 500 Å.

As described above, in order to prevent warp and to secure antistatic effect and enough hardness, the SiO$_2$ layer formed on the substrate through the LPD method should be 500 Å thick or more.

Figure 7A:
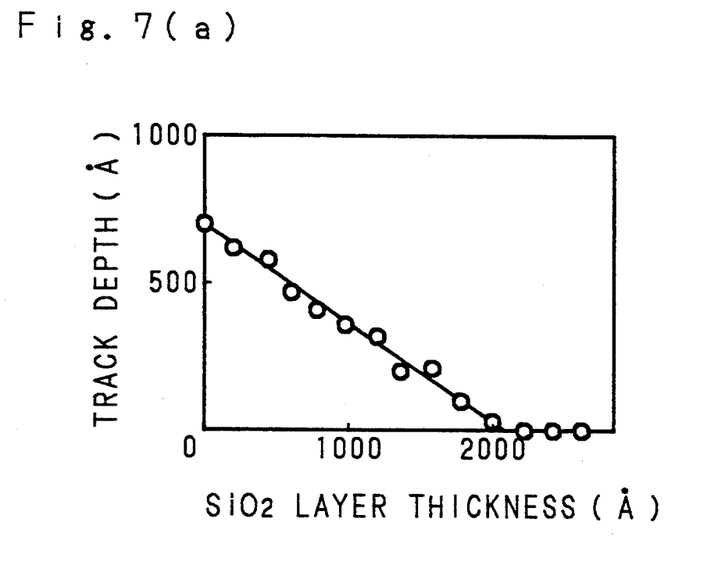
FIG. 7 is graphs each showing the relation between the thickness of the SiO₂ layer and depth or width of a groove.
Figure 7B:
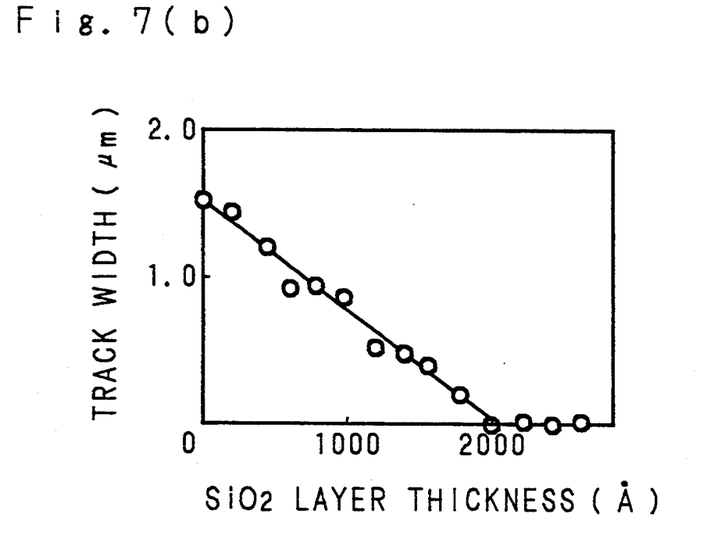

The grooves on the optical disk observed by an electron microscope, are completely filled in by the SiO$_2$ layer, as shown in FIG. 7, when the film thickness of the SiO$_2$ layer exceeds 2000 Å, thereby making it impossible to calculate the design correction against the change of the configuration of the grooves caused by the SiO$_2$ layer. In other words, it is necessary to form the SiO$_2$ film not thicker than 2000 Å if the layer is formed on the surface of the substrate where the grooves are already formed.

This invention will be discussed more in detail with reference to preferred embodiment thereof.

Figure 8:
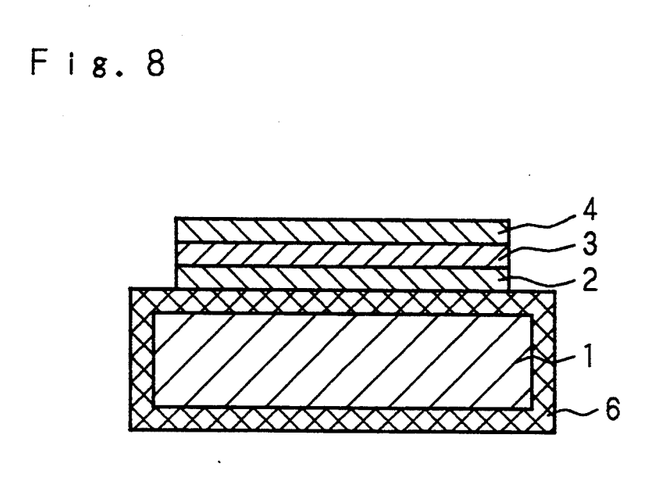
FIG. 8 through 14 are cross sectional views of an optical disk according to this invention.

Referring to FIG. 8, reference numerals 1, 6, 2, 3 and 4 are a polycarbonate substrate, an SiO$_2$ layer, an SiNx dielectric enhance layer, a TbFeCo magnetic recording layer, and an SiNx dielectric protection layer, respectively. On the substrate 1 produced by using an optimum stamper which is able to correct the above-mentioned change of the configuration of the grooves, the SiO$_2$ layer 6 of 1000 Å thick is formed by the LPD method disclosed in Japanese Patent Laid-Open No. 63-112632 (1988), and then the enhance layer 2, recording layer 3 and protection layer 4 are sequentially laminated through sputtering.

The tilt of the optical disk when the circumstances are changed from 60° C.50%RH to 60° C.90%RH is so small as 0.3 mrad. Moreover, the surface hardness at the substrate side is 5 H, and the half life of the charged voltage is 10 seconds. That is, this optical disk has both the large surface hardness and the favorable antistatic property. Since the grooves are formed properly by the adjustment of the stamper beforehand, signals can be recorded and reproduced well in the same manner as in a disk without the SiO$_2$ layer 6. Since the SiO$_2$ layer 6 is formed before the recording layer 3 is formed on the optical disk according to this invention, dusts are not easy to adhere to the optical disk, and the disk is not easily damaged during laminating through sputtering. So that any delicate treatment is unnecessary and the removal of the dusts is easy, thereby improving the operating efficiency and the yield.

Now, a different embodiment of this invention will be described.

Figure 9:
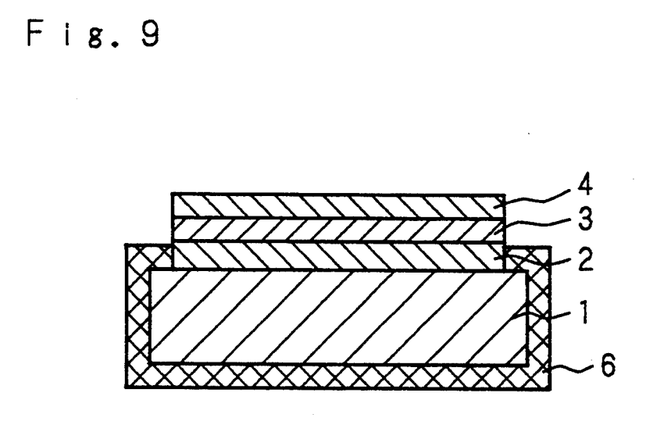

In FIG. 9, reference numerals 1, 6, 2, 3 and 4 represent a polycarbonate substrate, an SiO$_2$ layer, an SiNx dielectric enhance layer, a TbFeCo magnetic recording layer and an SiNx dielectric protection layer, respectively. After the area of the substrate 1 where the grooves are formed is masked so as not to be in touch with the solution, the SiO$_2$ layer 6 of 1000 Å thick is formed by the LPD method disclosed in Japanese Patent Laid-Open No. 63-112632 (1988). Then, the enhance layer 2, recording layer 3 and protection layer 4 are sequentially laminated through sputtering on the SiO$_2$ layer 6.

Even when the circumstances are changed from 60° C.50%RH to 60° C.90%RH, the tilt of the optical disk is so small as 0.3 mrad, and the surface hardness at the substrate side is 5 H, the half life of the charged voltage is 10 seconds. This optical disk has both the large surface hardness and good antistatic property. Moreover, since the area with grooves is masked, the configuration of the grooves is not changed, making the recording/reproducing characteristic of signals good. According to this embodiment, since the SiO$_2$ layer 6 is formed before the recording layer 3 is formed dusts are not easy to adhere to the substrate 1 and the substrate 1 is not easily damaged. So that any delicate treatment is unnecessary and the dusts can be removed easily, thereby improving the operating efficiency and yield of the disk.

A further embodiment of this invention will be explained below.

Figure 10:
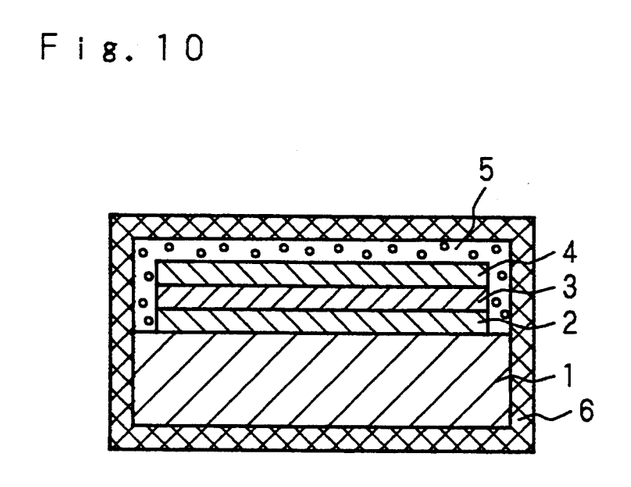

Referring to FIG. 10, reference numerals 1, 6, 2, 3, 4 and 5 represent a polycarbonate substrate, an SiO$_2$ layer, an SiNx dielectric enhance layer, a TbFeCo magnetic recording layer, an SiNx dielectric protection layer and a resinous protection layer, respectively. The enhance layer 2, recording layer 3 and protection layer 4 are formed in this order on the substrate 1 through sputtering. Then, the resinous protection layer 5 is formed as to cover the layers 2, 3 and 4, which are totally covered by the SiO$_2$ layer 6 of 1000 Å thick formed by the LPD method disclosed in Japanese Patent laid-Open No. 63-112632.

When the circumstances are changed from 60° C.50%RH to 60° C.90%RH, the tilt of the optical disk is considerably small 0.3 mrad, with the surface hardness at the substrate side 5 H and half life of the charged voltage 10 seconds. The optical disk has large surface hardness and good antistatic property. Since the recording layer 3 is formed before the SiO$_2$ layer 6 is formed, the recording/reproducing characteristic of the signals of the optical disk results good. At the same time, the SiO$_2$ layer 6 is formed also at the recording layer side in addition to at the substrate side, so that the whole of the optical disk is protected from the dusts and not easily damaged.

A yet further embodiment will be depicted.

Figure 11:
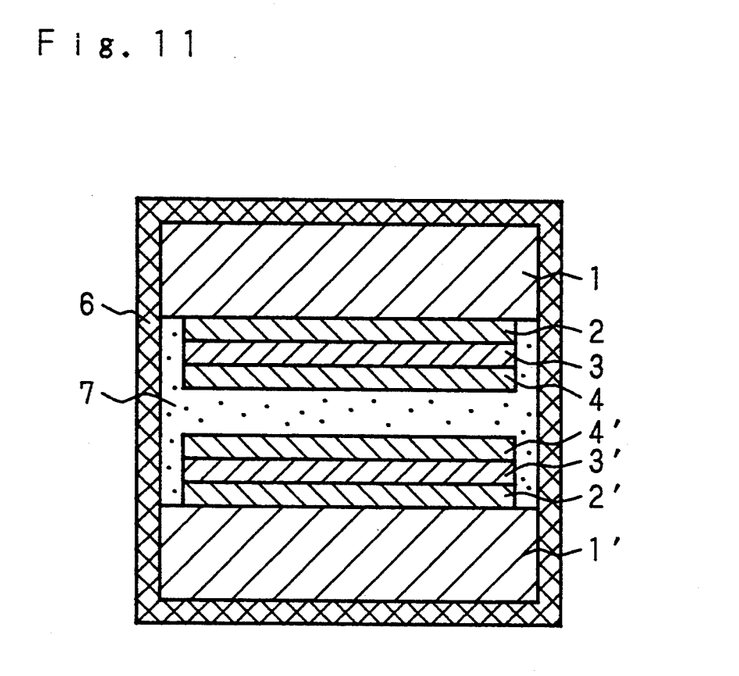

In FIG. 11, reference numerals 1, 1' indicate polycarbonate substrates, 2, 2' SiNx dielectric enhance layers, 3, 3' TbFeCo magnetic recording layers, 4, 4' SiNx dielectric protection layers, 6 an SiO$_2$ layer and 7 an adhesion layer. The enhance layer 2, recording layer 3 and protection layer 4 are sequentially laminated on the substrate 1 through sputtering. Two units of these layers 1, 2, 3, 4 and 1', 2', 3', 4' are bonded by the epoxy adhesion layer 7 with their recording layer sides facing each other. Then, the SiO$_2$ layer 6 of 1000 Å thick is formed to cover the whole surface of the bonded units by the LPD method disclosed in Japanese Patent Laid-Open No. 63-112632 (1988).

The surface hardness of the optical disk obtained in the aforementioned manner is as high as 5 H all over the surface thereof, and the half life of the charged voltage is 10 seconds. Therefore, this optical disk has not only the large surface hardness, but the good antistatic property. Since the two units are bonded, the optical disk is free from the deformation or warp, and Moreover, the recording area becomes double, achieving a high recording density. A still embodiment will be discussed below.

Figure 12:
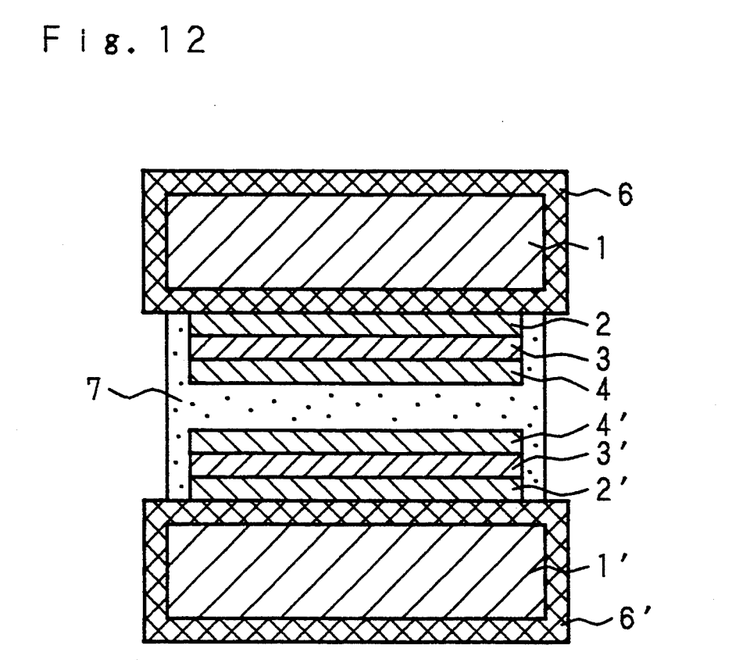

In FIG. 12, reference numerals 1, 1' represent polycarbonate substrates, 6, 6' SiO$_2$ layers, 2, 2' SiNx dielectric enhance layers, 3, 3' TbFeCo magnetic recording layers, 4, 4' SiNx dielectric protection layers and 7 an adhesion layer. The substrate 1 is formed by a stamper which is adjusted to correct the change of the grooves caused by the SiO$_2$ layer as referred to with reference to FIG. 7. The SiO$_2$ layer 6 of 1000 Å thick is formed to enclose the substrate 1 through the LPD method of Japanese Patent Laid-Open No. 63-112632 (1988), and thereafter the enhance layer 2, recording layer 3 and protection layer 4 are laminated sequentially in this order through sputtering. Two units of this laminated bodies are bonded with each other by the epoxy adhesion layer 7 with their recording layer sides facing each other.

The surface hardness of the optical disk obtained in the aforementioned manner is 5 H all over the surface thereof, and the half life of the charged voltage is 10 seconds. Accordingly, the optical disk has the large surface hardness and good antistatic property. Moreover, the bonded substrates do not warp, while enjoying the double recording area, thereby realizing the optical disk with high density. Furthermore, since the $SiO_2$ layer 6 is formed before the recording layer 3 is formed, the substrate 1 can be prevented from dusts or being damaged during the lamination through sputtering or bonding. The substrate is easy to treat and dusts are easily removed, thereby improving the operating efficiency and yield.

A still further embodiment will be discussed below.

Figure 13:
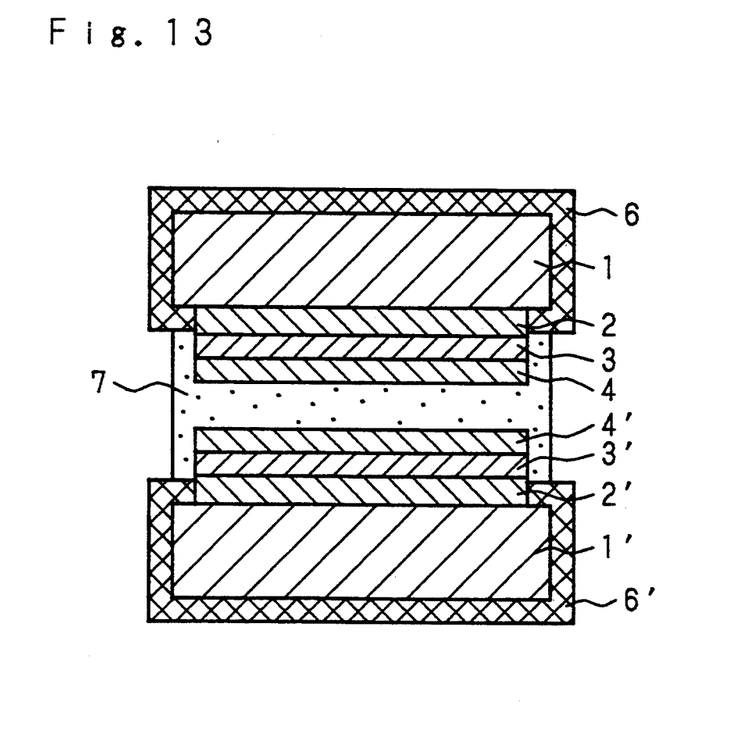

In FIG. 13, reference numerals 1, 1' show polycarbonate substrates, 6, 6' $SiO_2$ layers, 2, 2' SiNx dielectric enhance layers, 3, 3' TbFeCo magnetic recording layers, and 4, 4' SiNx dielectric protection layers. The area of the substrate 1 where the grooves are formed is masked so as not to be in touch with the solution. Then, the $SiO_2$ layer 6 of 1000 Å thick is formed to enclose the substrate 1 by the LPD method disclosed in Japanese Patent Laid-Open No. 63-112632 (1988). The enhance layer 2, recording layer 3 and protection layer 4 are sequentially laminated on the $SiO_2$ layer 6 through sputtering. Two units of the laminated bodies are bonded by an epoxy adhesion resin with their recording layer sides facing each other.

The optical disk of the still further embodiment has the surface hardness of 7 H all over the surface thereof, and the half life of the charged voltage of 10 seconds. Both the large surface hardness and good antistatic property are secured. Since the optical disk is obtained by bonding the two units, having the double recording area, a high density recording medium without generating warp can be realized. Since the area where the grooves are formed is masked, the configuration of the grooves is not changed, enabling good recording/reproducing characteristic. At the same time, since the $SiO_2$ layer 6 is formed before the recording layer 3 is formed, the substrate 1 is hard to be damaged or dusts are hard to adhere during the laminating or bonding process thereof. The substrate is easy to treat and the dusts can be removed therefrom easily, so that the operating efficiency and yield can be improved.

Now, it will be described when the resinous protection layer 5 of the embodiment shown in FIG. 10 is formed of a fluorocarbon resin.

After the enhance layer 2, recording layer 3 and protection layer 4 are sequentially laminated on the polycarbonate substrate 1 through sputtering, tetra-fluoroethylene-hexafluoropropylene copolymer (Neoflon FEP by Daikin Co.,Ltd.) is coated. Then, the $SiO_2$ layer 6 of 1500 Å thick is formed to enclose the laminated layers by the LPD method disclosed in Japanese Patent Laid-Open No. 63-112632 (1988). The result of various tests of the disk will be enumerated in an item of Embodiment A in an accompanying Table 1.

When the circumstances are changed from 60° C.50%RH to 60° C.90%RH in 30 minutes, the tilt is considerably small 0.5 mrad.

When the optical disk is placed under the circumstances of 80° 90%RH for 500 hours, there is no change at all in the C/N and bit error rate. Likewise, the surface hardness is not changed from 7H after the test. The charging characteristic hardly changes. The optical disk has favorable reliability.

Next, it will be discussed as to the case where chlorotrifluoroethylene copolymer (Lumiflon by Asahi Glass Co.,Ltd.) is used for the resinous protection layer 5 of FIG. 10. In this case, the optical disk is manufactured under the same conditions as the Embodiment A except the fluorocarbon resin. The result of various kinds of tests is shown in Table 1 in an item of Embodiment B.

The tilt is 0.3 mrad when the circumstances are changed from 60° C.50%RH to 60° 90%RH. Every characteristic is not changed after the optical disk is left in the 80° C.90%RH circumstances for 500 hours. Further, no change is observed in every characteristic after the Z/AD (temperature humidity) test of JIS-C5024I. The optical disk is accordingly highly reliable.

A further different embodiment will be explained.

Figure 14:
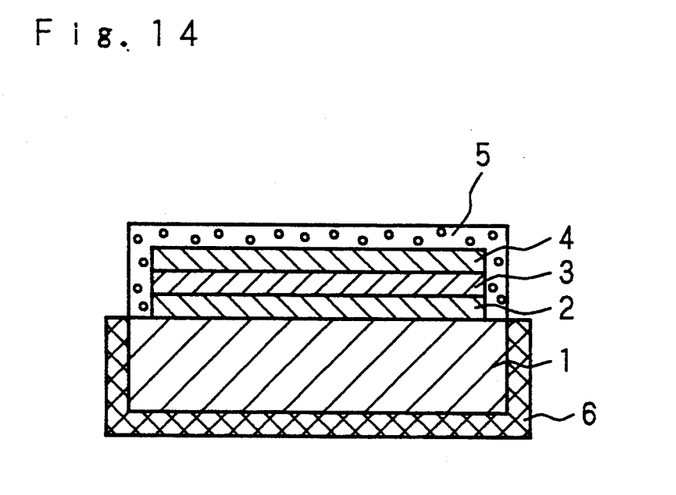

In FIG. 14, reference numerals 1, 2, 3, 4 and 5 are a polycarbonate substrate, an SiNx dielectric enhance layer, a TbFeCo recording layer, an SiNx protection layer and a chlorotrifluoroethylene copolymer protection layer employing Lumifelon by Asahi Glass Co.,Ltd. The enhance layer 2, recording layer 3 and protection layer 4 are sequentially laminated on the substrate 1 through sputtering. Then, the $SiO_2$ layer 6 of 1500 Å thick is formed by the LPD method of Japanese Patent Laid-Open No. 63-112632 (1988) on the portion where the substrate is exposing. The result of tests of the optical disk is shown in an item of Embodiment C in Table 1.

At the change of the circumstances from 60° C.50%RH to 60° C.90%RH, the tilt is 0.7 mrad. The C/N and bit error rate are not changed when the optical disk is put in 80° C.90%RH for 500 hours and through the Z/AD test of JIS-C5024I. Moreover, the pencil hardness at the surface of the substrate is not changed from 7 H. The charging characteristic is good at both surfaces of the disk, and the reliability is not deteriorated during the tests.

Accordingly, when the $SiO_2$ layer is formed by the LPD method on the portion where the substrate material is exposing after the recording layer is coated with the fluorocarbon resin, it is prevented that the substrate absorbs moisture, thereby avoiding the warp of the plastic substrate. As a result, the optical disk has large surface hardness and superior antistatic property. The optical disk is not easily damaged or adhered with dusts. Moreover, the number of procedures for the LPD treatment can be reduced. Since the chlorotrifluoroethylene is used for the fluorocarbon resin to coat the recording layer, a highly reliable optical disk can be manufactured at low cost with reduced number of procedures.

Although the substrate 1 is formed of polycarbonate in the above-described embodiments, this invention is not restricted to the polycarbonate substrate, but a plastic substrate or a glass substrate may be employed.

According to the embodiments, although the adhesion layer 7 is formed of an epoxy resin, the other resin may be employed in this invention. It is to be noted, however, that a resin with high sealing property is preferable so as to inhibit the solution from permeating through the boundary when the SiO$_2$ layer is formed by the LPD method after the bonding.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

TABLE 1

| | Outer appearance after LPD treatment | Charge of tilt when 60° C. 50% RH → 60° C. 90% RH | Outer appearance & characteristic 500 hours later in 80° C. 90% RH | Outer appearance & characteristic after JIS-C5024 Z/AD test | Pencil hardness (glass) | Charging property |
|---|---|---|---|---|---|---|
| Embodiment A | good | 0.5 mrad | no change | local cracks | 7H | good |
| Embodiment B | good | 0.3 mrad | no change | no change | 7H | good |
| Embodiment C | good | 0.7 mrad | no change | no change | 7H | good |
| Comparative examples | | | | | | |
| SiNx sputtering film | corrosion at many points all over the surface | — | — | — | — | — |
| Acrylic film by company A(a) | corrosion at any points all over the surface | — | — | — | — | — |
| UV setting resin by company B(a) | corrosion at many points all over the surface | — | — | — | — | — |
| UV setting resin by company B(b) | corrosion at many points all over the surface | — | — | — | — | — |
| UV setting resin by company C(a) | corrosion at many points all over the surface | — | — | — | — | — |
| Polycarbonate resin by company D(a) | corrosion at many points all over the surface | — | — | — | — | — |
| Polycarbonate resin by company E(a) | corrosion at many points all over the surface | — | — | — | — | — |

What is claimed is:

1. An optical disk comprising:
   a substrate;
   a magnetic film for recording information, the film being formed adjacent to one side of the substrate;
   a protection film comprising a fluorocarbon polymer which covers at least said magnetic film; and
   an SiO$_2$ film with a thickness of at least 500 Å which covers said protection film and the substrate in areas of the substrate which are adjacent to neither the magnetic film nor the protection film.

2. An optical disk as set forth in claim 1, wherein said fluorocarbon polymer is chlorotrifluoroethylene copolymer.

3. An optical disk as set forth in claim 1, wherein said fluorocarbon polymer is tetrafluoroethylene-hexafluoroproplyene copolymer.

* * * * *